(12) United States Patent
Iturriz et al.

(10) Patent No.: US 8,467,206 B2
(45) Date of Patent: Jun. 18, 2013

(54) POWER RECTIFIER CIRCUIT AND SYSTEMS, ASSOCIATED METHOD, AND AIRCRAFT COMPRISING SUCH A CIRCUIT OR SYSTEMS

(75) Inventors: Marcelo Fernando Iturriz, Lavernose Lacasse (FR); Frederic Richardeau, Flourens (FR); Thierry Meynard, Beauzelle (FR); Hassan Helali, Tarbes (FR)

(73) Assignees: Airbus Operations S.A.S., Toulouse (FR); Centre National de la Recherche Scientifique, Paris (FR); Institut National Polytechnique de Toulouse, Toulouse (FR)

( * ) Notice: Subject to any disclaimer, the term of this patent is extended or adjusted under 35 U.S.C. 154(b) by 249 days.

(21) Appl. No.: 12/865,575

(22) PCT Filed: Jan. 21, 2009

(86) PCT No.: PCT/FR2009/000063
§ 371 (c)(1),
(2), (4) Date: Jul. 30, 2010

(87) PCT Pub. No.: WO2009/109714
PCT Pub. Date: Sep. 11, 2009

(65) Prior Publication Data
US 2011/0002148 A1     Jan. 6, 2011

(30) Foreign Application Priority Data

Jan. 31, 2008   (FR) ...................... 08 50622

(51) Int. Cl.
*H02M 7/08* (2006.01)
(52) U.S. Cl.
USPC .............................. 363/70; 363/126; 363/127
(58) Field of Classification Search
USPC ................... 363/17, 53, 54, 56.02, 56.05, 67, 363/69, 70, 71, 89, 98, 126, 128, 132, 127
See application file for complete search history.

(56) References Cited

U.S. PATENT DOCUMENTS 4,742,535 A *  5/1988  Hino et al. .................... 378/105
5,119,283 A     6/1992  Steigerwald et al.
(Continued)

FOREIGN PATENT DOCUMENTS

FR        2 881 896        8/2006
FR        2 897 731        8/2007
(Continued)

*Primary Examiner* — Adolf Berhane
*Assistant Examiner* — Lakaisha Jackson
(74) *Attorney, Agent, or Firm* — Oblon, Spivak, McClelland, Maier & Neustadt, L.L.P.

(57) ABSTRACT

A power rectifying circuit for an electric current signal supplied by an alternating power source, which includes: two separate switching assemblies adapted to be connected to a power terminal of the source, wherein at least one switching assembly includes a plurality of boost cells in cascade, each boost cell including a diode, a switch mechanism and a capacitor, the capacitors of the two terminal boost cells of the switching assemblies having one terminal in common. The circuit may include two assemblies of boost cells, and can be used in electric systems onboard aircrafts.

15 Claims, 6 Drawing Sheets

U.S. PATENT DOCUMENTS

| | | | |
|---|---|---|---|
| 5,737,201 A * | 4/1998 | Meynard et al. | 363/60 |
| 6,147,882 A | 11/2000 | Huber et al. | |
| 7,292,460 B2 * | 11/2007 | Barbosa et al. | 363/17 |
| 8,027,132 B2 * | 9/2011 | Omaru | 361/93.1 |
| 8,169,797 B2 * | 5/2012 | Coccia et al. | 363/21.03 |
| 2007/0258275 A1 * | 11/2007 | Brochu et al. | 363/64 |
| 2010/0110593 A1 * | 5/2010 | Kim et al. | 361/18 |
| 2011/0044077 A1 * | 2/2011 | Nielsen | 363/37 |

FOREIGN PATENT DOCUMENTS

| | | |
|---|---|---|
| JP | 7 194100 | 7/1995 |
| JP | 11 69786 | 3/1999 |
| JP | 2005 73440 | 3/2005 |
| JP | 2005 117873 | 4/2005 |
| JP | 2005 328646 | 11/2005 |

* cited by examiner

POWER RECTIFIER CIRCUIT AND SYSTEMS, ASSOCIATED METHOD, AND AIRCRAFT COMPRISING SUCH A CIRCUIT OR SYSTEMS

The present invention relates to a power rectifying device and method, to an associated system and to an aircraft comprising such a device and/or system.

In the field of conversion and regulation of electrical energy by electronic power circuits, numerous applications require a functionality of alternating current/direct current (AC/DC) rectifier type in which the AC side performs sinusoidal sampling of the current in phase with the voltages of the supply network, in order to optimize the power factor as close as possible to 1 and to obtain an optimum energy efficiency and/or to satisfy the quality standards of the distribution network. The DC side constitutes the output of such circuits. The AC supply side of such an alternating current network may be, for example, an electricity generating system installed on board an aircraft to supply an on-board network, such as described in applications FR 2881896 and FR 2897731. In particular, the DC stage may itself supply a DC/DC or DC/AC converter, such as a motor-inverter assembly or an emergency power supply.

The developments in power electronics have drawn attention to the performances of AC/DC converters based on active switched-mode rectifiers associated with pulse width modulation techniques (PWM, acronym for "Pulse Width Modulation" according to English terminology). These circuits are essentially based on power semiconductors, in which the pulse modulation makes it possible to control the flow of power drawn from the alternating current network. These circuits also make it possible to regulate the continuous DC voltage at the output, especially with a view to supplying other DC/DC or DC/AC converters.

Solutions known heretofore exhibit two-level voltage modulation, consequently having the disadvantage of necessitating high-inductance inductors on the AC side and a large weight penalty.

Known solutions use what are known as "standardized" symmetric commutation cells, in the form of a voltage inverter, equipped with two transistor-diode assemblies (dual transistor-diode) controlled by PWM generators. For example, there are known two transistor-diodes in series on a source of DC voltage E.

Such circuits have the advantage of being versatile and modular, but they still become rapidly complex because of the large number of transistors and of electronic control signals applied to the transistors. In addition, these systems appear to be less reliable than a passive diode-type rectifier and they have clearly larger power losses by reason of the presence of twice as many components, which on average generate additional losses due to the high-frequency commutations and high voltage rating of components, typically 1200 V, in industry.

Furthermore, these systems are based on voltage switching at two levels (in other words, offering two DC voltage levels from the AC side: −E/2 V and E/2 V), necessitating the use, at the rectifier input, of AC smoothing inductors having sufficiently high inductance to correspond to the volt-seconds (proportional to the voltage E multiplied by the switching period Tdec, where E denotes the DC voltage and Tdec (or Fdec) represents the switching period (or frequency)). This results in a large penalty in terms of weight and volume.

In these traditional circuits, the commutation cells are composed of two transistors in series. A low-impedance failure (or short circuit) of one of these results in short-circuiting of the DC bus, in which a large amount of energy may be stored, in particular several hundreds of joules. This energy may be sufficient to lead to explosion of housings unless rapid protection is activated on the transistors.

Even in the presence of this protection, this type of fault may propagate to the supply network and to other adjacent cells of the circuit, which necessitates adding supplementary isolating and redundant devices to the circuit to safeguard the failed portion of the circuit and to continue energy management in emergency mode.

The resulting circuits then rapidly exhibit configurations that are more complex, more costly and probably associated with a risk of loss of reliability compared with a simple passive diode-type rectifier.

A need therefore exists to have fault-tolerant rectifying circuits, at once trustworthy, efficient from the viewpoint of volt-seconds applied to the inductors, and using switches of low voltage rating.

Some of the above disadvantages disappear when the interest lies in the particular case in which power reversibility is not required, is prohibited or impossible, for example in the case in which the initial supply network is of alternating current type in view of supplying a unidirectional direct current bus with power. An on-board network in an aircraft generally exhibits these characteristics, where an alternating current generator is delivering electrical energy to the entire aircraft.

In the absence of reversibility, the switching circuits are simplified, the commutation cells are no longer able to be reversible in current and then comprise no more than a single transistor and a single diode, therefore a reduced number of transistors and of means for controlling the transistors. This results in a lower cost, reduced risks of faults in the control circuit and smaller power losses. Such circuits are therefore adapted for applications/equipment requiring power over a broad range and industrial voltages, such as 300 V to 1200 V, typically 800 V.

The circuits obtained in this way are traditionally known as PCF circuits ("Power Factor Correction", or correction of the power factor) or as "boost" (step-up) rectifiers with sinusoidal sampling.

In the case of a three-phase supply, the boost rectifiers are based on a bridge of six diodes or three branches of rectifiers comprising 2 or 4 diodes (for all of the three phases of the supply source) associated with a single or double boost circuit. On FIG. 1 there has been shown a double boost circuit equipped with a 2-diode rectifier and exhibiting three voltage levels on the AC side, which makes it possible to divide the volt-seconds dimensioning the inductors by 2. This circuit is described in particular in the Barbosa dissertation ("*Three-Phase Power Factor Correction Circuits for Low-Cost Distributed Power Systems*", Peter Mantovanelli Barbosa—report of Dissertation defended at the Faculty of the Virginia Polytechnic Institute and State University, Jul. 31, 2002, Blacksburg, Va.).

Two unidirectional current boost cells 10 and 11 are seen, each connected to alternating current supply 12 by rectifying diodes 13 and 14 and an inductor 15. Each boost cell is composed of a diode 100 or 110, a switch 102 or 112 and a capacitor 104 or 114 (defining a continuous DC voltage bus). Hereinafter the terms "component of a boost cell" and "boost component" will be used synonymously, for example for a boost diode.

This circuit functions at a switching frequency Fdec corresponding to the repeat frequency of the control instructions to the transistor switches.

These solutions provide a simplification of switching circuits accompanied by a decrease in inductance of input inductors 15, especially by virtue of the appearance of a third level (in this case the voltage levels –E/2, 0 and E/2 are obtained on the AC side), which makes it possible to use inductors having inductance reduced by half.

The withstand voltage of the assembly of components (boost diodes and transistors) is also reduced by half, and the rating of these components, including tolerance margins, is reduced by the same proportion, from 1200 V to 600 V.

The circuit of FIG. 1 is already a first step toward greater operating safety. In fact, any fault in one of the two transistors is spontaneously isolated by the boost diodes. In this way short circuiting of the DC bus is avoided in such a scenario.

Nevertheless, the fault propagates to the AC phase, necessitating isolation, for example by fusible link or thyristor.

It nevertheless is noted that the isolation of one of the two boost cells causes the circuit to function only during a single half period of the input wave from the AC side.

A solution to this limitation is known, in particular from patent application FR 2809548, which introduces a topological redundancy by describing a multi-level boost rectifying circuit, one particular case of which has five levels. Two equivalent diagrams illustrating the topology of this known rectifying circuit have been shown on FIGS. 2a and 2b.

This circuit comprises four boost cells 20 to 23. The first stage, formed by cells 20 and 21, has the same topology as the circuit of FIG. 1 (in the absence of rectifying diodes 13 and 14). A second identical stage (cells 22 and 23) has been added downstream from the first stage, in this way creating five output voltage levels in total on the AC side: –E/2; –E/4; 0; E/4; E/2.

It is seen that the addition of an identical stage in cascade makes it possible to reduce the rating by 2 and to use only standard voltages of 600 V.

The presence of the second stage makes it possible to double the switching frequency to 2.Fdec. In this way frequencies up to a few hundred kilohertz are possible, permitting an increase of the useful pass band if the AC network is of high frequency, and a decrease of the volt-seconds applied to the inductors entails a reduction in the dimensions of the passive components, especially of input inductor 15. This reduction makes it possible in particular to apply reduced voltages to the components for a given supply voltage and therefore to under-dimension the components (economic benefits) or, at the same rating, to accept much higher supply voltages.

The increased switching frequency also makes it possible to decrease the capacitance of the capacitors in the boost cells, with the consequence that a smaller amount of energy is stored in the circuit. Thus, when a boost diode breaks down and the transistor of the cell causes the capacitor to be short-circuited, the risk of explosion is rapidly averted.

In addition, when a transistor breaks down, the circuit is safeguarded by the presence of the boost diode and the energy is dissipated by recycling to the AC sources. In this way the safety of such a system is increased.

This solution also has the advantage of being fault-tolerant. In fact, in the case of a fault of a transistor switch, for example that of cell 20, the other stage, in this case cell 22, continues to switch, now at the switching frequency Fdec (because it keeps on switching during the active half cycle of the supply current despite the failed cell). In the case of failure of a switch, one output voltage level thus is lost, at the cost of a static overvoltage (that is to say at the terminals of the diodes) of 50% and a dynamic overvoltage (that is to say at the terminals of the switches/transistors) of 100%, and a single switching frequency results for the upper or lower part affected by this failure.

It is seen that, in this solution, the diodes in boost cells 20 to 23 must be dimensioned for the totality of differential voltages of the cell, therefore for a voltage rating equal to E/2 (E/4+E/4 for the first stage and E/2+E/2–E/4–E/4 for the second stage). Thus, for an output voltage of E=800 V applied in industry, it is advisable to use diodes having a rating of at least 400 V, or generally 600 V, including a margin.

However, this solution has the disadvantage that, in case of failure of switches, the diodes of the boost cells are subjected to a static voltage of 3E/4 (+50%), or in other words, 600 V, in the above example, and to a dynamic voltage of E/2 (+100%), or in other words 400 V. Thus, in the presence of diodes rated at 600 V, including a safety margin, the circuit is not fault-tolerant. Thus, to achieve fault tolerance, it then is indispensable to dimension the components for at least 600 V (that is to say without margin), in particular to dimension the diodes for at least 800 V, including a margin, or in other words beyond the output voltages E/2 being used.

To avoid limiting the functioning to 600 V, a voltage rating of 800 or even 1200 V is therefore necessary, but adversely affects the performances in commutation speed, voltage drop and power loss of the diodes.

In addition, another disadvantage of this structure lies in the fact that the commutation cells contain one diode and two transistor-diode pairs, one of these pairs being static. That leads to higher parasitic inductances than in the foregoing circuits.

With regard to these disadvantages, it is sought to obtain a power rectifying circuit that is intrinsically—that is to say without addition of supplementary circuits—tolerant to failures of switches and diodes and that requires diodes and switches (transistors) of lower rating for the same output voltages.

The invention aims in particular to overcome these disadvantages by providing a multi-level fault-tolerant voltage rectifying circuit comprising boost cells, especially with a single transistor and a single diode per cell.

In particular, a boost cell assures switching despite the internal failure of another boost cell, which guarantees tolerance to failures of switches or diodes.

In addition, the circuit according to the invention makes it possible to have the diodes function at a voltage of E/4 (that is to say 200 V for an 800 V voltage source) and thus to require, in the case of failure, a rating of E/2 (that is to say 400 V), or in other words the output voltage. Thus components rated at 600 V are possible with a reasonable operating margin.

For this purpose, the invention aims in particular at a power rectifying circuit for an electrical current signal (or wave) delivered by an alternating current source, comprising:

two separate commutation assemblies arranged to be connected to a supply terminal of the source, at least one commutation assembly comprising a plurality of commutation cells, referred to as boost cells, in cascade, each boost cell comprising a diode connected between a first input terminal and a first output terminal of the cell, a switch means connected between a second input terminal and a second output terminal of the cell, and a capacitor connected between the two output terminals of the cell, the boost cells of a commutation assembly being arranged in cascade so that the first and second output terminals of one boost cell are connected respectively to the first and second input terminals of the following boost cell, the capacitors, known as terminal capacitors, of the two terminal boost cells (of the cascade) of the assemblies having one terminal in common.

In particular, the common terminal is the second output for each of the commutation assemblies.

The concept of input/output of the cells such as used above is independent of the direction of the current passing through the circuit, especially because one of the commutation assemblies is traversed in a direction inverse to the other, even though they have a substantially symmetric structure.

By "separate" there is understood the fact that, for each of the commutation assemblies, the corresponding boost cells (that is to say those of the same stage within the meaning of FIGS. 2a and 2b) of the upper part (first commutation assembly) and of the lower part (second assembly) do not share components. This results in the absence of voltage constraint ("stress" according to English terminology) for the components between the assemblies and therefore in better containment.

This "separation" of the commutation assemblies also makes it possible to decrease the thermal coupling of the circuit compared with that of FIG. 2b. In fact, in the latter, the two transistor/diode pairs, one of which is static, require that they be positioned in geographically close manner in order to create the minimum of parasitic inductance. The reverse of this necessity is a large thermal coupling of these two pairs, which disappears by virtue of the invention.

In contrast to the prior art circuits, the invention also makes it possible to use transistor switches and diodes in the boost cells at a voltage of E/4 or in other words 200 V, in the above example, for a configuration of 2×2 cells. In case of failure, the diodes of the boost cells are at most subjected to voltages of E/2, or in other words the output voltage. Thus, by reducing the rating by a factor of 2 compared with the known solutions, faster components having fewer power losses are obtained.

The switching frequency and the number of voltages on the AC side are multiplied, especially according to the number of imbricated cells, that is to say the number of stages or groups. In this way the volt-seconds applied to the input inductor (and therefore the size thereof) and the silicon-commutated voltamperes VA can be effectively reduced compared with the prior art, where the silicon-commutated VA are defined as the sum of the products of the voltage at the terminals multiplied by the current flowing in each of the transistor switches of the cells of the circuit.

In particular, in its configuration of 2×2 cells, the invention makes it possible, with the same number of transistors, that is to say the same level of complexity, to divide the value of the input inductance by a factor of 2 to 8, the silicon-commutated volt-amperes by a factor of 2, and ultimately to reduce the losses compared with the prior art solutions by approximately 30%.

Thus it is provided that each commutation assembly can comprise two boost cells. This configuration offers a good compromise between a small input inductance and a reasonable number of transistors, thus limiting the total stored energy (compared with the presence of N boost cells, or in other words 2 N capacitors if N>>2).

Alternatively, it is possible for a commutation assembly to comprise more than two boost cells. It is specified here that an overly high number of transistors would increase, the amount of energy stored on average in the circuit. Thus a maximum of five boost cells, typically from 2 to 3, is provided per commutation assembly.

It is also contemplated to have a different number of cells between the two commutation assemblies. It is noted that this configuration corresponds to operating situations in which a certain number of cells have failed in the assembly having the fewest cells. In particular, the minimalist configuration provides one commutation assembly equipped with a single boost cell and the other commutation assembly equipped with two boost cells. This circuit is therefore fault-tolerant in one of the two boost cells of the same assembly and has diodes of reduced rating in these two same cells (that is to say a rating of only 600 V).

For balanced operation, however, it will be preferred to have an identical number of boost cells in each of the commutation assemblies.

In order to make the circuit more resistant to failures, it is possible to provide for the use of redundant cells or assemblies. In particular, it is possible to add a redundant cell in one or in each of the commutation assemblies, this redundant boost cell being passive, that is to say in standby state (transistor switch continuously held in conducting state) during the operation of the other cells. Upon detection of failure of one cell, the failed cell is substituted by this redundant cell. Depending on the position of the latter in the commutation assembly, it will be advisable to synchronize the control signals of the switches with the position of each of the cells operating within the commutation assembly.

Redundancy may also be applied to a commutation assembly, which will substitute for one of the two initial commutation assemblies in case of failure of too many boost cells, so that switching can no longer be continued. It will be possible to change the commutation assembly over to the redundant assembly by the use, for example, of a switch.

It is provided that the circuit comprises rectifying means.

In one embodiment, the rectifying means comprise a pair of rectifying means arranged to be connected between the said supply terminal and respectively each of the said commutation assemblies, so as to rectify the low-frequency input current.

Alternatively, it is conceivable that the rectifying means comprise rectifying diodes provided in each boost cell, these rectifying diodes being in series with the said switch means and conducting in the direction opposite to that of the corresponding boost diode (that is to say that of the same cell).

Returning to the first alternative above, since the boost cells are unidirectional in current (the commutation assemblies also being unidirectional by placing the boost cells in series in the same conducting direction), this configuration makes it possible to protect each of the commutation assemblies from inverse currents delivered during one half period of alternating current supply (a half period in which the other commutation assembly is under load). To this end, it is provided that the system is arranged to force the commutation means (transistors) of one commutation assembly to the conducting state while the other assembly is active.

In particular, each rectifying means comprises a diode, especially connected in series in the same conducting direction as the diodes of the commutation assembly to which it is connected.

Alternatively, each rectifying means comprises a thyristor, especially connected in series in the same conducting direction as the diodes of the commutation assembly to which it is connected.

By virtue of the use of a thyristor, it is possible to isolate one of the commutation assemblies in case of a fault in all of the cells of this assembly.

In addition, the thyristor has the merit of providing current control during the phase of precharging of the boost capacitors (at E/2 or E/4 in the configuration of 2×2 cells), especially upon startup of the system comprising the circuit.

It is provided in particular that these rectifying means are connected in series in the same conducting direction as the diodes of the commutation assembly to which they are respectively connected.

In one embodiment, the switch means comprise controlled transistors.

In one embodiment, the circuit comprises blocking means capable of blocking all the switch means of the said device in case of detection of a low-impedance fault in one of the boost cells.

In particular, detection may be achieved on the floating capacitors (at the output of each boost cell) or on the switch means.

The detection of these faults concerns a general problem, which can be dissociated from the inventive elements described above. In this design, and for the reasons explained below in the description, it will be possible to envision protecting, in separate manner, the solution of detection of a fault in a commutation cell in which two controlled switches are not available.

Thus it is possible for the circuit to comprise means for detecting a low-impedance fault in a boost cell arranged to detect the voltage at the terminals of the switch means of the cell during a predetermined time interval following a control signal to start the switch means in order to detect a fault of the boost diode of the cell or following a control signal to block the switch means in order to detect a fault of the said switch means.

In particular, the said means for detecting a low-impedance fault comprise a transistor controller coupled with a voltage detector.

According to a particular characteristic of the invention, it is provided that the circuit comprises a supply terminal arranged to be connected to the supply source.

The invention also applies to a power rectifying system for the electrical current delivered by a multi-phase alternating current supply source, comprising a plurality of power rectifying circuits as presented above and arranged such that each can be connected to a supply terminal connected to respectively each of the phases of the multi-phase current, and in which the circuits share the same terminal capacitors.

In this way there is obtained a system capable of rectifying a multi-phase current, and generally a two-phase or three-phase current.

The invention also applies to a power rectifying system for electrical current delivered by an alternating current source, comprising two corresponding power rectifying circuits as presented above and arranged to be connected respectively to each of the terminals of the supply source, and in which the circuits share the same terminal capacitors.

In this way a system based on the differential voltage at the terminals of the supply source is obtained.

In particular, it is possible to provide that one cell of one of the rectifying circuits and the corresponding cell of the other circuit (that is to say having the same relative position in each of the rectifying circuits) share the same capacitor.

In an embodiment in which a large number of circuit components are mutualized, it is provided that the two circuits are combined to the exclusion of rectifying means provided between each of the commutation assemblies and the two terminals of the source, the said rectifying means connected to a given commutation assembly being exclusive, in opposite directions of current flow.

In this way the number of components of the differential circuit and the associated losses are reduced.

Of course, if several phases are available on the source, this system is combined with that presented above for a multi-phase alternating current supply source. In particular, in the case of a three-phase supply, the differential voltage configuration requires six rectifying circuits such as presented above (2 circuits for the differential voltage of each of the 3 phases), all sharing the same two terminal capacitors.

The invention also applies to a power rectifying method for an electrical current signal delivered by an alternating current supply source, the method being achieved by a rectifying circuit comprising:
two separate commutation assemblies arranged to be connected to a supply terminal of the source, at least one commutation assembly comprising a plurality of commutation cells, known as boost cells, in cascade,
each boost cell comprising a diode connected between a first input terminal and a first output terminal of the cell, a switch means connected between a second input terminal and a second output terminal of the cell, and a capacitor connected between the two output terminals of the cell,
the boost cells of a commutation assembly being arranged in cascade so that the first and second output terminals of one boost cell are connected respectively to the first and second input terminals of the following boost cell, and
the capacitors, known as terminal capacitors, of the two terminal boost cells of the assemblies having one common terminal,
the method comprising a step of sequential control of each of the said switch means so as to deliver DC voltages to the terminals of the terminal capacitors.

In one embodiment, the method comprises a step of detecting a low-impedance fault (or short circuit) in at least one of the said boost cells, and, after the said detection, a step of blocking the said switch means of the boost cells. Blocking consists in changing the switch means into a blocking/closed position, as opposed to the conducting/open position of the switches. In this way it is possible to apply a blocking policy starting from a certain number of faults affecting the boost cells, as defined below.

In one embodiment, the switch means of a commutation assembly are forced to conducting state when the other commutation assembly is active over one half cycle of the input current. In this way the application of inverse voltages at the terminals of the transistors is prevented.

Optionally, the method may comprise steps and employ means relating to the circuit and system characteristics presented above.

The invention also applies to an aircraft comprising a device or a system according to any one of the configurations presented above.

The characteristics and advantages of the present invention will become more clearly apparent upon reading a preferred embodiment illustrated by the attached drawings, wherein.

Figure 3A:
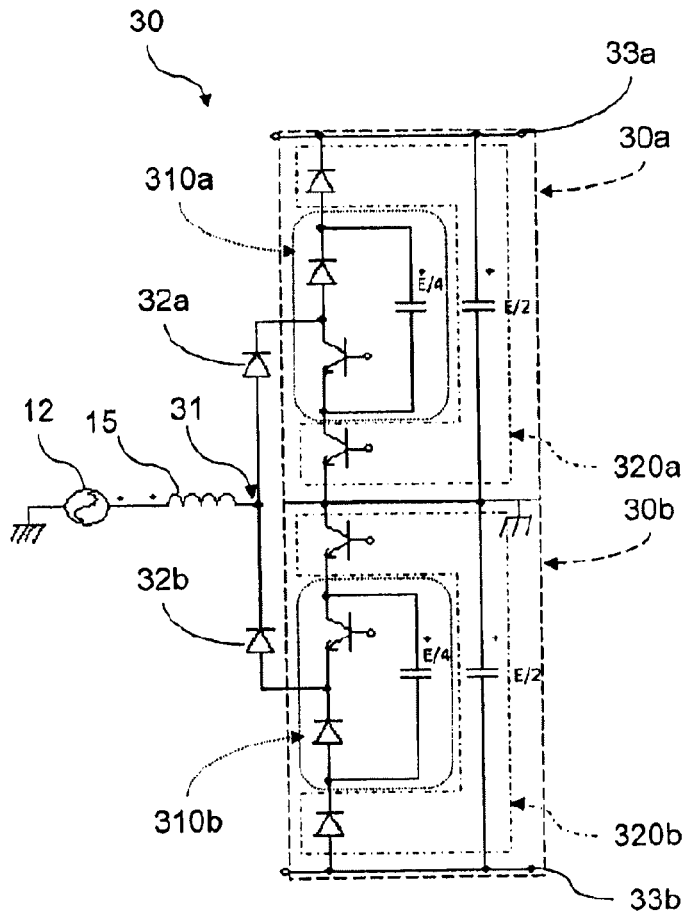
FIGS. 3a and 3b are two equivalent representations of an exemplary embodiment of the power rectifying circuit according to the present invention.
Figure 3B:
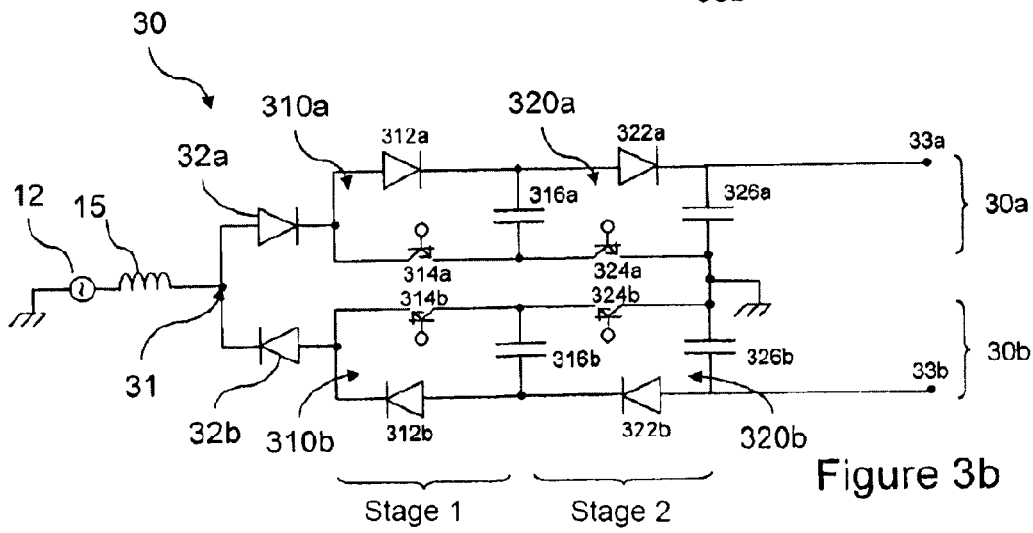
Figure 6:
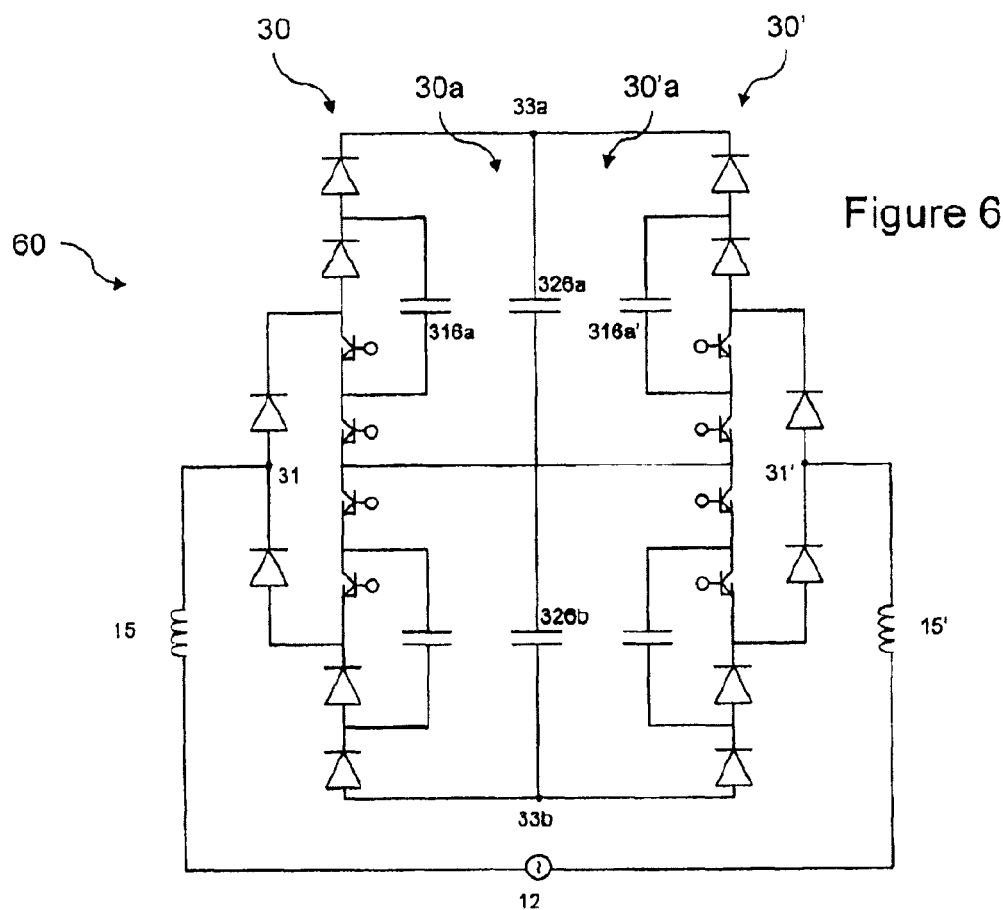
FIG. 6 illustrates an exemplary differential power rectifying circuit using the circuit of FIG. 3.
Figure 6A:
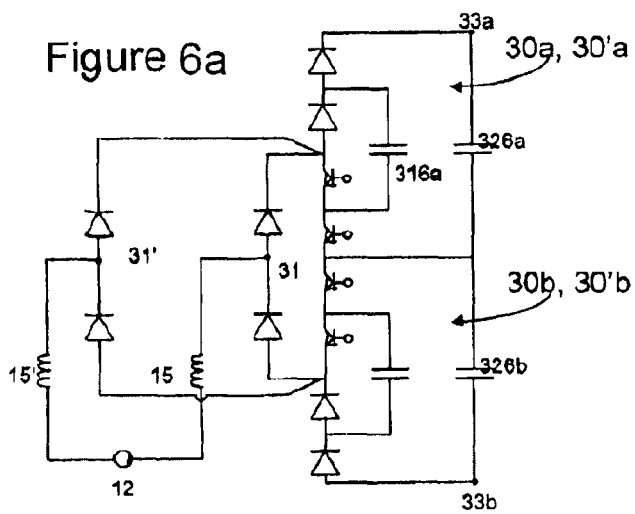
Figure 7:
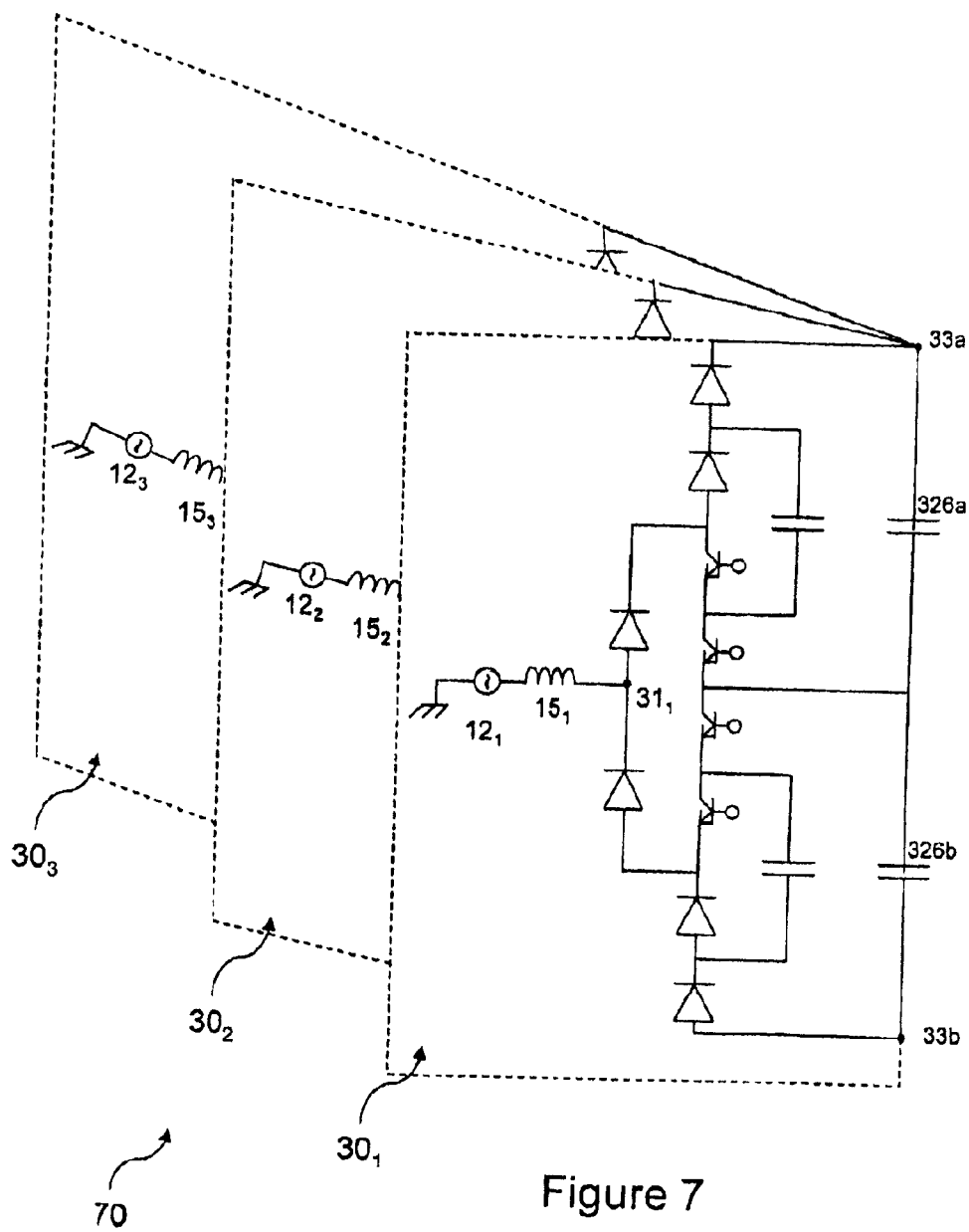
Figure 8A:
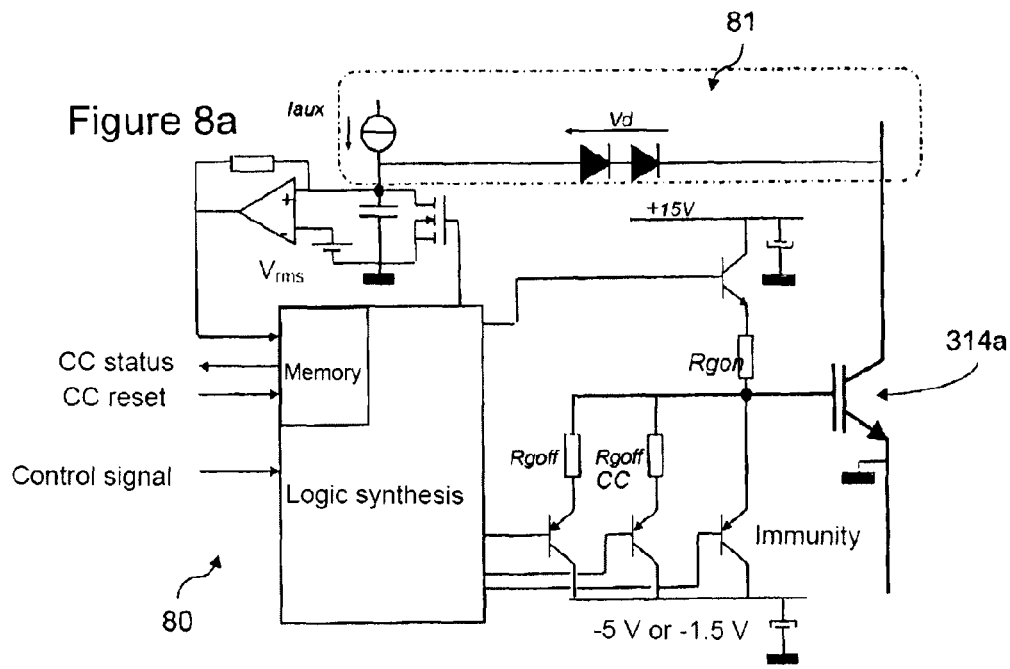
Figure 8B:
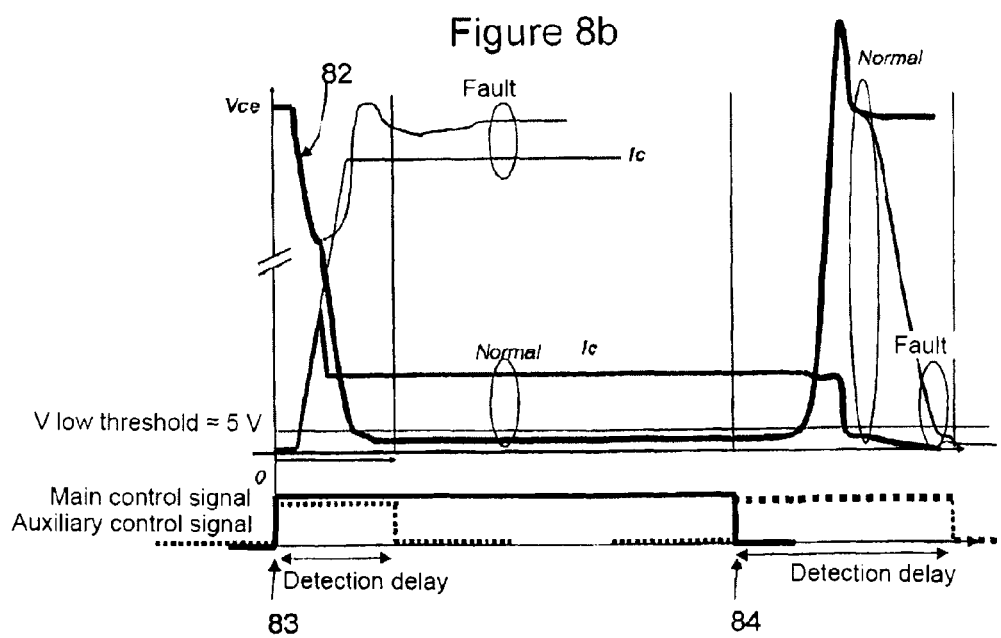

FIG. 6*a* shows a particular configuration of the circuit of FIG. 6, in which maximum mutualization of the components is effected;

FIG. 7 illustrates an exemplary power rectifying system for a three-phase supply using the circuit of FIG. 3; and FIGS. 8*a* and 8*b* respectively illustrate a means for detection of a low-impedance failure at the terminals of a transistor of FIG. 3 and the voltage at the terminals of this transistor for detecting this failure.

Figure 1:
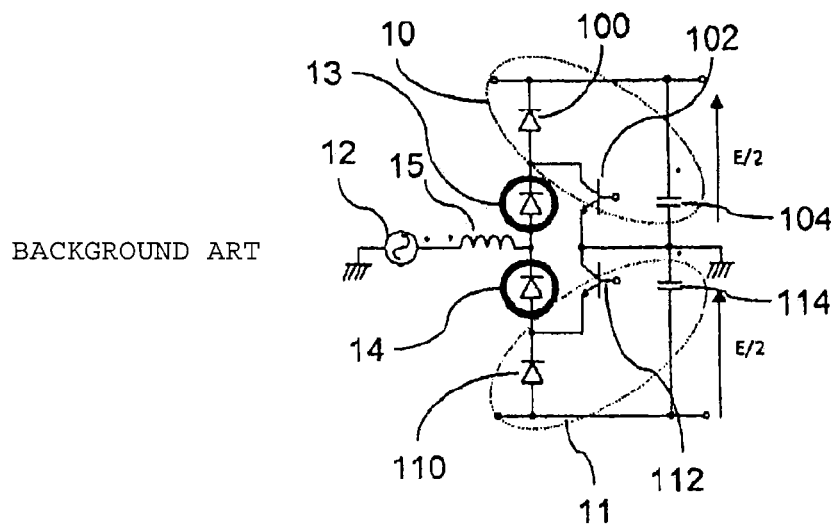
FIG. 1 shows a prior art double-boost, three-level AC/DC circuit.
Figure 2A:
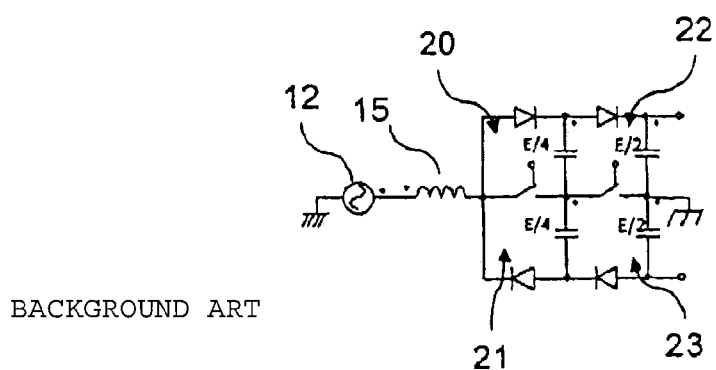
FIGS. 2a and 2b are two equivalent representations of a prior art multi-level rectifying circuit of SMC type.
Figure 2B:
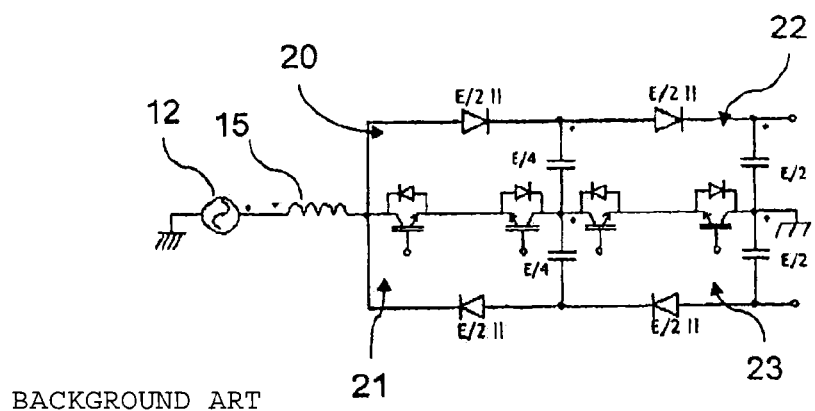

As already stated above, an exemplary embodiment of rectifying circuit 30 according to the invention and such as illustrated by FIG. 3 is based on the "double-boost three-level AC/DC" commutation circuit presented in FIG. 1.

An exemplary rectifier having 2×2 imbricated cells (310*a*, 310*b*, 320*a*, 320*b*) making it possible to change from 3 to 5 levels and from switching frequency Fdec to 2×Fdec compared with the circuit of FIG. 1 has been shown.

The circuit of FIG. 3 is applicable to a non-differential input voltage. There is an alternating current source 12 connected to an input inductor 15 forming a supply terminal 31 for the power rectifying circuit.

In detail, on the basis of the two boost cells of the circuit of FIG. 1, circuit 30 has two separate commutation assemblies 30*a* and 30*b*, each connected to supply terminal 31 by a rectifying means, in this case rectifying diodes 32*a* and 32*b*.

Each of the assemblies 30*a* and 30*b* is unidirectional, in that they allow current to flow in one direction only. Furthermore, the two assemblies exhibit opposite directions of current flow.

Rectifying diodes 32*a* and 32*b* are conducting in the same direction as commutation assemblies 30*a* and 30*b*, to which they are respectively connected.

Each commutation assembly 30*i* is composed of at least two boost cells, in this case two, 310*i* and 320*i* (i=a, b), themselves composed of a diode 312*i*/322*i*, a semiconductor controlled switch (314*i*/324*i*) of transistor type and a capacitor 316*i*/326*i*. The diodes 312*i*/322*i* of a given assembly 30*i* are arranged in the same conducting direction.

Each cell of a stage j is connected to a cell of a stage j+1 by connecting the diode and switch of cell j+1 to the respective terminals of capacitor j.

It is noted that a boost cell of a stage j does not have a part or component in common with the boost cell of the same stage j in the other commutation assembly. This independence assures that no voltage stress associated with dysfunctioning of one of the cells will affect the cell of the same stage j in the other assembly.

Diode 312*i* and switch 314*i* of the cell of first stage 1 are connected to rectifying diode 32*i*.

Each capacitor 326*i* of the cell of the last stage, in this case stage 2, is connected to the neutral terminal of AC source 12 (for a non-differential circuit as is the case in FIG. 3) by its terminal common to switch 324*i* of the same cell. Thus these capacitors 326*i*, known as terminal capacitors, have one common terminal and are connected in series.

Each commutation assembly 30*i* is connected at the output to an output terminal 33*i* via the terminal of terminal capacitor 326*i* which is common to diode 322*i*. In this way an equipment item (not shown) to be supplied is connected to output terminals 33*i*. In industry it is common practice to use equipment items functioning at a DC voltage of E=800 V, a value that is also being integrated into the next aeronautical standards.

Controlled switches 314*i* and 324*i* are driven by one or more control devices known to those skilled in the art (not shown, for example one device per stage j). For the circuit containing 2×2 boost cells, it is possible to use control signals similar to those disclosed in the aforementioned application FR 2809548 for a supply 12 of the same frequency. For this reason the mechanisms of charging and discharging of the four capacitors 316*i* and 326*i* by commutation of the four switches 314*i* and 324*i* is not described in further detail.

The circuit therefore makes it possible to obtain voltages on the AC side (−E/2, −E/4, E/4, E/2) as well as the potential 0 at the common terminal of terminal capacitors 326*i*.

This example can now be easily extrapolated to a circuit having 2×N cells. Such a resultant circuit also meets the criteria of the invention. However, it will be limited to 2×5 cells. Beyond this, large overall losses in switches 314*i*, 324*i*, etc., associated with the series connection of too many components, would detract from the circuit performances.

The voltage on the AC side then has 2N+1 voltage levels: −E/2N, . . . , −E/4, −E/2, 0, E/2, E/4, . . . , E/2N.

Figure 4:
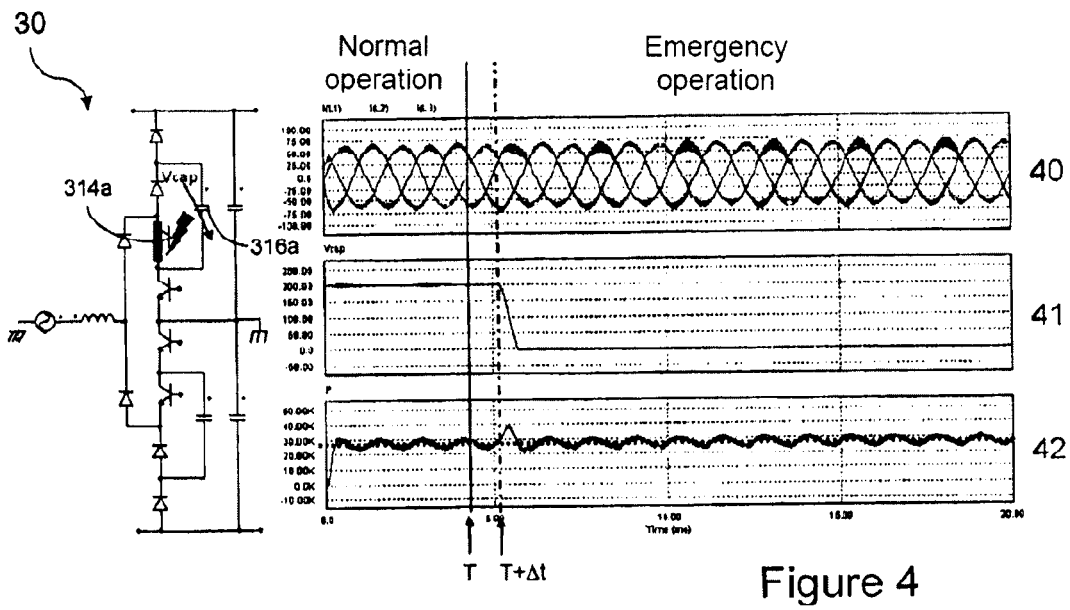
FIG. 4 illustrates the electrical behavior of the circuit of FIG. 3 in case of a low-impedance fault of one of the switches (transistors) of which it is composed.

Referring to FIG. 4, the tolerance of the circuit according to the invention to low-impedance faults now is explained. In this figure, graph 40 shows the currents of the three phases of three-phase source 12 (only one of these phases is of interest here, that received by the circuit in question) through the corresponding input inductors 15; graph 41 shows the voltage at the terminals of capacitor 316*a* of the failed cell; and graph 42 shows the power (and therefore the voltage, since the current intensity is kept constant by source 12) stabilized at the output of the circuit from a non-supplied state (t=0) to a stabilized state after the fault (up to t=20 ms).

Transistor 314*a* goes into a low-impedance fault, that is to say that it becomes continuously conducting. In FIG. 4, this fault occurs at instant T.

Diode 312*a*, which is immediately in series, then exhibits a voltage equal to −E/4 at its terminals. Diode 312*a* then becomes blocking and isolates the fault from the DC continuous bus; only cell 310*a* concerned is naturally taken out of service by progressive discharge of floating capacitor 316*a*.

Capacitor 316*a* ultimately becomes discharged. The voltage at its terminals drops gradually to 0 at the instant T+Δt during each switching period, where Δt is the time necessary for the half cycle in question to pass through the failed transistor in order to permit its discharge. In practice, this value depends mainly on the characteristics of capacitor 316*a*. The energy released by this uncontrolled discharge is returned to the network (source 12).

Diode 312*a* remains in blocking state, isolating failed boost cell 310*a*.

It is noted here that, even though switch 314*a* has failed, cell 310*b* functions normally, without a substantial voltage being present at the terminals of diode 312*b*.

With failed cell 310*a* isolated, switching of the alternating current is maintained on contiguous cell 320*a*, by means of an overvoltage corresponding to a factor of 2 for diode 322*a*. Nevertheless, this overvoltage is not necessarily stressing, by reason of the initial reduction by a factor of 2 in the rating compared with the prior art, all the more so because the maximum rating attained is E/2, or in other words the maximum voltage sought at the output.

This additional load on cell 320*a* surviving the fault results in particular from the fact that the electrical current associated with the positive voltage (half period of the current half cycle) delivered by source 12 is entirely handled by this boost cell 320*a*.

It is noted here that commutation assembly 30*b* is not affected by this failure and continues to function at 2.Fdec for each of the two cells 310*b* and 320*b*.

Naturally, since capacitor 316*a* is isolated, circuit 30 works with only 4 voltage levels: −E/2, −E/4, 0 and E/2.

It is noted, however, that the power delivered at the output is kept relatively constant despite the fault (see graph 42 of FIG. 4). Specifically, at the instant t+Δt, there is observed a localized rise in output power associated with the fact that, because of the failure, common terminal 31 experiences a potential drop, leading to an increase of current in the inductor via the voltage drop at the terminals of this inductor, and consequently to a power spike.

Capacitor 316a of the failed cell discharges and returns the energy of the failed cell to the network.

Since the two commutation assemblies 30b are separate, it is also possible to tolerate a fault in one of the two cells 310b and 320b. In general, it is possible that the boost cells of a commutation assembly will fail one after the other. Nevertheless, the commutation assembly assures switching over the half cycle in question of the source current as long as at least one sound cell remains.

In order to alleviate any failure of the assembly of cells of a given commutation assembly 30i, it is possible to replace low-frequency rectifying diode 32i by a thyristor, in order to spontaneously isolate the commutation assembly upon passage through zero. In this way any short circuit of the output bus is avoided.

Figure 5:
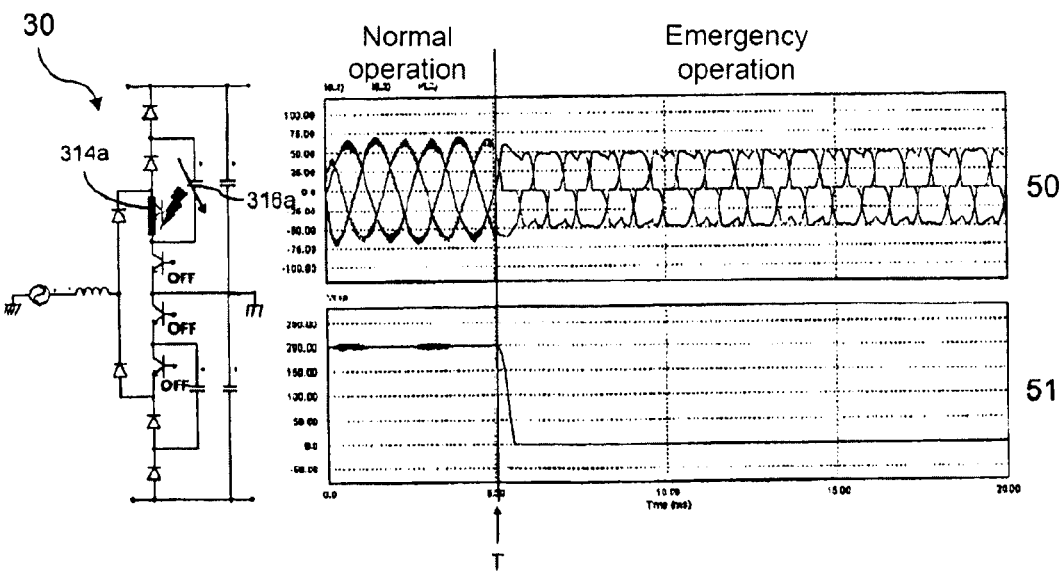
FIG. 5 illustrates the electrical behavior of the circuit of FIG. 3 in case of blocking of the circuit following a low-impedance fault of one of the switches.

Referring to FIG. 5, another embodiment of the response of the circuit to a low-impedance fault now is illustrated. This embodiment is applicable in particular when the overvoltage stress of surviving diode or diodes 324a of a commutation assembly 320a affected by a failure is disabling, for example by reason of commutation losses or overvoltages.

FIG. 5 again illustrates the circuit (left part) and also presents a graph 50 of the three phase currents at the terminals of the corresponding input inductors 15 and a graph 51 of the voltage at the terminals of the capacitor of the failed cell.

As in FIG. 4, circuit 30 experiences a low-impedance fault at the position of controlled transistor 314a at instant T.

In this embodiment, the fault that has occurred is detected first of all.

Referring to FIG. 8a, there has been shown a transistor controller 80 coupled with a voltage detector 81 used to detect the faults in one of the boost cells. Detection is achieved on the basis of the voltage behavior at the terminals of the controlled transistor. Since this circuit is known to those skilled in the art, the components are not described in further detail.

The graph of FIG. 8b illustrates the voltage at the terminals of transistor 314a measured by circuit 80-81 (curve 82, where the left part in bold illustrates the normal behavior and the lighter parts illustrate erroneous behavior permitting detection of a fault) following a control signal to change to the conducting state (83) and a control signal to change to the blocking state (84).

As used conventionally, this system makes it possible to detect any fault of a second component of the boost cell in which the controlled transistor, in this case 314a, is inserted: in the present case a fault of diode 312a is detected.

In detail, the voltage at the terminals of transistor 314a is Vce in the blocking state. At instant 83, the transistor is changed to the conducting state. In case of normal operation of the boost cell, the voltage decreases to a quasi-zero value (bold curve). In the presence of a fault of adjacent diode 312a, the voltage rises to the value Vce after a few μs, typically 5 μs. Thus a delay of approximately ten μs is provided after control signal 83 in order to detect whether the resultant voltage at the terminals of transistor 314a has been modified (normal behavior) or not (failed behavior of the diode).

Nevertheless, the conventional use of this circuit 80 does not permit the detection of a fault of the same transistor 314a, especially because no need to do so was apparent, from the fact that these circuits 80 were generally used in these cells comprising two transistors, which then performed reciprocal monitoring of one another.

In the absence of a need for detection for the transistor itself, without the presence of a second transistor having a symmetric role, one object of the invention provides for achieving the detection of the fault of transistor 314a following the control signal to change to blocking state 84.

As can be seen in FIG. 8b, the normal behavior of the transistor (bold curve) following control signal 84 tends to a voltage on the order of Vce at its terminals.

On the other hand, in the presence of a fault of the transistor, such as a low-impedance fault, this transistor 314a does not maintain the voltage Vce at its terminals following control signal 84, but the voltage at the terminals drops to a quasi-zero value (light curve).

The delay in detection of the phenomenon is approximately 5 μs. A detection period of approximately ten μs is therefore provided to determine whether or not a modification of the voltage at the terminals of the transistor has occurred following the application of blocking control signal 84.

By equipping each of the transistors with such a circuit 80 as well as with ad hoc detection logic, it is thus possible to detect a fault in any transistor of circuit 30.

Upon detection of the fault, the control device of the switches blocks all switches (in operation) of circuit 30, as illustrated by the OFF symbols in FIG. 5. As seen above, detection also may relate to a failure of a diode.

Circuit 30 then corresponds to a single diode rectifier (diode bridge), as illustrated by graph 51.

This embodiment may be modulated by establishing different policies for blocking switches that are still functioning, depending on the detection or detections achieved. In particular, blocking of all switches can be achieved only when the number of failed transistors in a given commutation assembly 30i reaches a threshold value. Such a value may be predefined theoretically in order to define a threshold voltage applied to the diodes, taking into account both the rating of the boost diodes and the number of stages (since the overvoltage experienced due to a failure depends on the number of stages and adds to the overvoltage experienced through a second failure in the same commutation assembly).

In practice, this embodiment is used with a multi-phase, for example three-phase, supply (see FIG. 7). In this case, all the controlled switches of the circuit (of one phase) affected by the fault are blocked, and the output power of the three-phase system is then adjusted by circuits $30_2$ and $30_3$ of the (two) other phases, in particular to preserve the regulation of the DC bus.

Referring to FIG. 6, the use of the circuit constituting the object of the invention is now described in a differential approach.

Differential power rectifying system 60 then comprises two circuits 30 and 30', which in particular are identical to the circuit of FIG. 3, and their supply terminals 31 and 31' are connected respectively to an input impedance 15 and 15', which are connected to the two terminals of alternating current source 12.

The two circuits 30 and 30' have their output capacitors 326a and 326b in common, in such a way as to form a single output bus of system 60 between terminals 33a and 33b.

It is seen here that the commutation assemblies having a common output capacitor, referred to as "corresponding" commutation assemblies (such as 30a and 30'a), are not used during the same half cycle of the current of source 12. It is then provided that the components of two corresponding assemblies will be mutualized, this mutualization being able to apply to one or more components.

In particular, according to a complementary embodiment, it is possible to envision using common capacitors (316a/b, 316a'/b') for the "corresponding" boost cells of the two circuits 30 and 30' or connecting the two capacitors 315a/b, 316 a'/b' of the two corresponding cells in parallel (which reduces the size of the capacitors).

FIG. 6a presents the case of maximum mutualization, even if intermediate states of mutualization are provided. In this configuration, the boost cells of the two circuits 30 and 30' are combined, which leads to a commensurate reduction of the number of diodes and transistors.

As can be seen in this figure, each commutation assembly 30-30'a, 30-30'b is connected by the same terminal to the two terminals of the supply via rectifying diodes positioned in opposite direction. Thus it is seen that the diodes connected to a given commutation assembly are mutually exclusive (opposite conducting direction), so that the commutation assembly is used successively for each of the two half cycles of the current of source 12 via each of the two rectifying diodes.

This configuration thus uses the four controlled transistors continuously, the applied control signals being offset by 90° ($\pi/2$) between these different transistors.

As indicated in the foregoing, the mutualization may be partial, for example, a single commutation assembly is mutualized with the corresponding assembly of the other circuit.

In particular, the differential system obtained in this way has 9 voltage levels for a control frequency equal to 4.Fdec.

Referring to FIG. 7, the use of the circuit constituting the object of the invention now is described for a multi-phase, in particular a three-phase source 12, in a non-differential approach.

The power rectifying system for three-phase supply 70 comprises three circuits $30_1$, $30_2$ and $30_3$, each similar to that of FIG. 3, connected respectively to one phase $12_1$, $12_2$, $12_3$ of supply source 12.

The three circuits have their terminal capacitors 326a and 326b in common, so as to form a single output bus of system 70 between terminals 33a and 33b.

The modulation of the control signal of the controlled switches of the three circuits is similar. In particular, the switches having an identical position in each of the three circuits $30_1$, $30_2$ and $30_3$ respectively are controlled by modulation offset by the same angle as the phases of the supply source, in this case substantially $2\pi/3$.

It is also possible to provide a differential power rectifying system for a multi-phase supply by applying division of the circuits of FIG. 6 for each of the phases of the system of FIG. 7: six circuits $30_1$, $30'_1$, $30_2$, $30'_2$, $30_3$ and $30'_3$ are then obtained.

The foregoing examples are only some embodiments of the invention, which is not limited thereto.

The invention claimed is:

1. A power rectifying circuit for electrical current delivered by an alternating current source, comprising:
   two separate commutation assemblies arranged to be connected to a supply terminal of a source, at least one commutation assembly comprising a plurality of commutation boost cells in cascade;
   each boost cell comprising a diode connected between a first input terminal and a first output terminal of the cell, a switch means connected between a second input terminal and a second output terminal of the cell, and a capacitor connected between the two output terminals of the cell,
   the plurality of commutation boost cells of at least one of the commutation assemblies being arranged in cascade so that the first and second output terminals of one boost cell are connected respectively to the first and second input terminals of the following boost cell,
   the capacitors of the two terminal boost cells of the commutation assemblies having one terminal in common,
   wherein the power rectifying circuit further comprises blocking means for blocking all the switch means of the circuit in case of detection of a low-impedance fault in one of the boost cells, and
   the power rectifying circuit further comprises means for detecting a low-impedance fault in a boost cell arranged to detect a voltage at terminals of the switch means of the cell during a predetermined time interval following a control signal to start the switch means to detect a fault of the boost diode of the cell or following a control signal to block the switch means to detect a fault of the switch means.

2. The power rectifying circuit according to claim 1, wherein each commutation assembly comprises two boost cells.

3. The power rectifying circuit according to claim 1, further comprising a pair of rectifying means arranged to be connected between the supply terminal and respectively each of the commutation assemblies, so as to rectify a low-frequency input current.

4. The power rectifying circuit according to claim 3, wherein each power rectifying means comprises a diode.

5. The power rectifying circuit according to claim 3, wherein the power rectifying means are in series with a same forward direction as the diodes of the commutation assembly to which the power rectifying means are connected.

6. A power rectifying system for electrical current delivered by a multi-phase alternating current supply source, comprising:
   a plurality of power rectifying circuits each according to claim 1, arranged such that each can be connected to a supply terminal connected to respectively each of phases of the multi-phase current, and in which the circuits share the capacitors of the final boost cells.

7. The power rectifying system according to claim 6, wherein a cell of one of the rectifying circuits and the corresponding cell in the other circuit share the same capacitor.

8. A power rectifying system for the electrical current delivered by an alternating current supply source, comprising:
   two power rectifying circuits each according to claim 1, arranged to be connected respectively to each of terminals of the supply source, and in which the circuits share the capacitors of the final boost cells.

9. The power rectifying system according to claim 8, in which the two circuits are combined to exclusion of rectifying means provided between each of the terminals of the source and each input of the two commutation assemblies, the rectifying means connected to a given commutation assembly being exclusive, in opposite directions of current flow.

10. The power rectifying circuit according to claim 1, wherein the switch means comprises controlled transistors.

11. The power rectifying circuit according to claim 1, wherein the means for detecting a low impedance fault comprises a transistor controller that is coupled to a voltage detector.

12. An aircraft comprising a power rectifying circuit according to claim 1.

13. A power rectifying method for an electrical current signal delivered by an alternating current supply source, the method being achieved by a rectifying circuit comprising:
- two separate commutation assemblies arranged to be connected to a supply terminal of the source, at least one commutation assembly comprising a plurality of commutation boost cells in cascade,
- each boost cell comprising a diode connected between a first input terminal and a first output terminal of the cell, a switch means connected between a second input terminal and a second output terminal of the cell, and a capacitor connected between the two output terminals of the cell,
- the boost cells of at least one of the commutation assemblies being arranged in cascade so that the first and second output terminals of a boost cell are connected respectively to the first and second input terminals of the following boost cell, and
- the capacitors of the two terminal boost cells of the assemblies having one common terminal,
- the method comprising sequential control of each of the switch means so as to deliver DC voltages to the terminals of the terminal capacitors,
- the method comprising blocking all the switch means of the circuit in case of detection of a low-impedance fault in one of the boost cells, and
- the method comprising detecting a low-impedance fault in a boost cell arranged to detect a voltage at terminals of the switch means of the cell during a predetermined time interval following a control signal to start the switch means to detect a fault of the boost diode of the cell or following a control signal to block the switch means to detect a fault of the switch means.

14. The method according to claim 13, further comprising sensing a low impedance fault in at least one of the boost cells, and following the sensing, blocking the switching means in the boost cells.

15. The method according to claim 13, further comprising forcing the switching means of a commutation assembly to be in a forward state when the other commutation assembly is active during an alternation of an input current.

* * * * *